United States Patent [19]

Peters

[11] Patent Number: 4,650,406
[45] Date of Patent: Mar. 17, 1987

[54] APPARATUS FOR FORMING GUSSETS IN A TUBULAR PLASTIC FILM

[75] Inventor: Rudolf Peters, Lengerich, Fed. Rep. of Germany

[73] Assignee: Windmöller & Hölscher, Lengerich, Fed. Rep. of Germany

[21] Appl. No.: 802,455

[22] Filed: Nov. 27, 1985

[30] Foreign Application Priority Data

Nov. 27, 1984 [DE] Fed. Rep. of Germany ....... 3443236
Feb. 26, 1985 [DE] Fed. Rep. of Germany ....... 3506772
Jul. 8, 1985 [DE] Fed. Rep. of Germany ....... 3524391

[51] Int. Cl.⁴ .............................................. B29C 53/10
[52] U.S. Cl. .................................. 425/72 R; 264/40.2;
264/40.5; 264/563; 425/140; 425/150; 425/163;
425/326.1; 425/387.1
[58] Field of Search ............... 425/72 R, 387.1, 326.1,
425/140, 141, 150, 163; 264/562–569, 40.2,
40.5, 40.7; 493/439

[56] References Cited

U.S. PATENT DOCUMENTS

| | | | |
|---|---|---|---|
| 2,544,044 | 3/1951 | Reber et al. | 425/326.1 X |
| 2,607,078 | 8/1952 | Grimes | 264/569 X |
| 2,961,930 | 11/1960 | Wamsley et al. | 493/439 |
| 3,335,208 | 8/1967 | Harris | 264/566 |
| 3,368,007 | 2/1968 | Palmer | 264/40.5 X |
| 3,566,756 | 3/1971 | Schmid et al. | 493/439 |
| 3,930,781 | 1/1976 | Upmeier | 425/72 R X |
| 4,246,212 | 1/1981 | Upmeier et al. | 425/72 R X |
| 4,355,966 | 10/1982 | Sweeney et al. | 425/72 R X |
| 4,462,779 | 7/1984 | Brinkmeier et al. | 425/326.1 X |

FOREIGN PATENT DOCUMENTS

| | | | |
|---|---|---|---|
| 1504039 | 9/1969 | Fed. Rep. of Germany | 425/72 R |
| 2248516 | 4/1974 | Fed. Rep. of Germany | 425/326.1 |
| 1529222 | 10/1978 | United Kingdom | 425/72 R |

Primary Examiner—Richard L. Chiesa
Attorney, Agent, or Firm—Fleit, Jacobson, Cohn & Price

[57] ABSTRACT

Folding elements for forming gussets in a tubular film are provided in the mutually opposite open areas between a pair of flattening plates and the plates are reciprocable in the axial direction of the tubular film for an adjustment of the depth of the gussets. The folding elements are mounted to be pivotally movable in all directions and are guided to be transversely displaceable relative to the axis of the tubular film. Adjacent to their mutually opposite, upstream ends the folding elements are provided with adjusting means for imparting a pivotal movement which is transverse to the direction in which the depth of the gussets is adjusted and/or about their longitudinal axes in dependence on a measured deviation of the outer fold lines from their desired position. Sensors are provided for detecting the location of the outer fold lines of the gussets formed in the tubular film.

11 Claims, 8 Drawing Figures

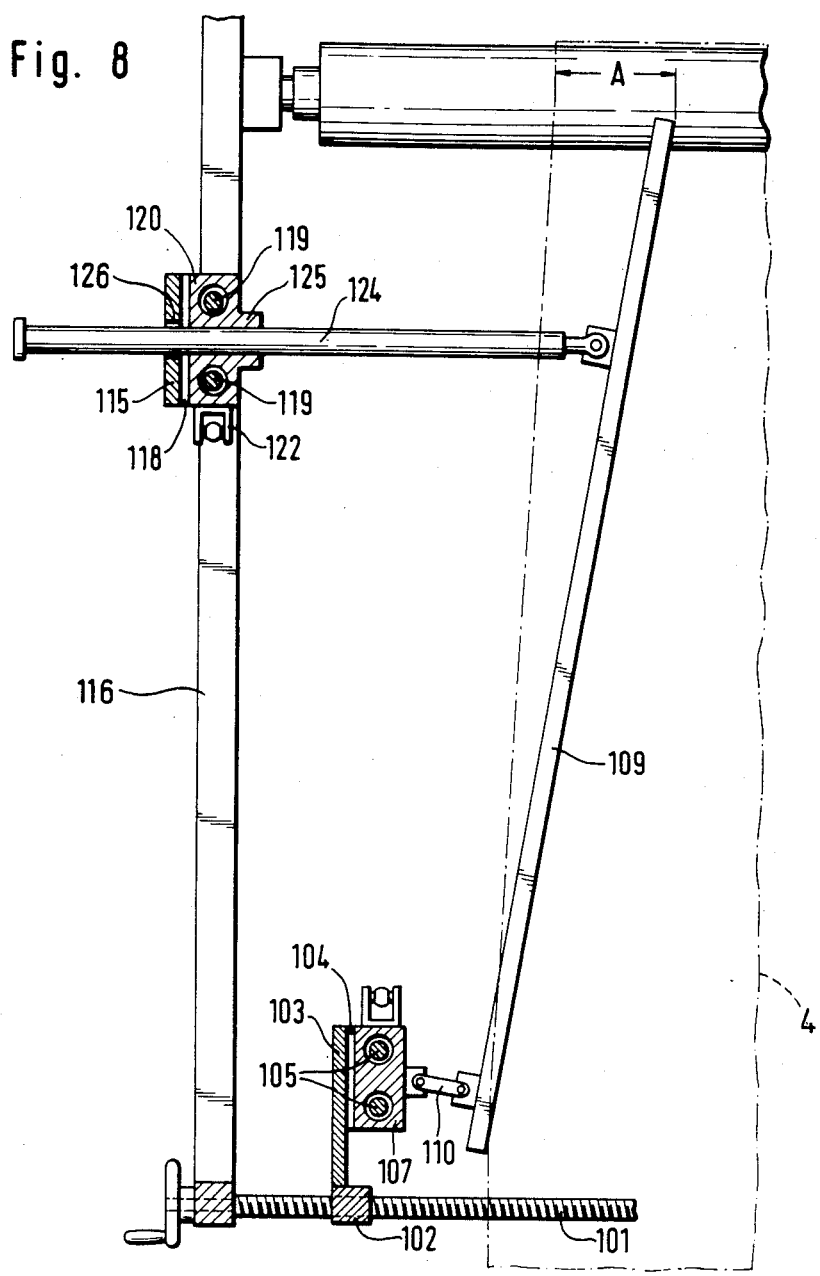

APPARATUS FOR FORMING GUSSETS IN A TUBULAR PLASTIC FILM

BACKGROUND OF THE INVENTION

1. Field of the Invention

This invention relates to apparatus for forming a gusset in a tubular plastic film, and more particularly it relates to gusset forming apparatus including folding panels that are disposed adjacent to the center plane of a film tube and are movable in the mutually opposite open areas defined by a pair of flattening plates to gusset the film and to permit adjustment of the depth of the gusset.

2. Description of the Prior Art

Folding elements are known for forming gussets in tubular films. Even if the folding elements of the prior art apparatus are centrally and symmetrically arranged with respect to the flattening plates and to the nip between the pinch rollers for taking off the flattened tubular film, the fold lines of the gussets may wander from the desired course. Such wandering may be caused by the nature and shape of the inflated tubular film, by the material which is processed and, if the tubular film is peripherally reciprocated as it is withdrawn, by the rotation of the flattening plates and of the pinch rollers about the axis of the tubular film.

It is an object of the invention to provide an apparatus which permits an inflated tubular film, even if it is subject to disturbing influences, to be gusseted in such a manner that the outer edges of the flattened tubular film will assume a predetermined, desired position, particularly a position in which they are aligned in cross-section.

SUMMARY OF THE INVENTION

Briefly stated, in accordance with one aspect of the present invention, apparatus for forming opposed gussets in a tubular plastic film is provided. The apparatus includes flattening means for defining a wedge-shaped gap into which a tubular plastic film passes and in which it is substantially flattened. Folding means are provided upstream of the gap for reflecting opposed lateral portions of the tube inwardly to form outer fold lines that define gussets. The folding means are disposed adjacent opposite, wedge-shaped gaps on opposite sides of the flattening means. First adjusting means are connected to the folding means for pivotally moving the folding means inwardly relative to the axis of the tubular film, and second adjusting means are connected to the folding means for moving the folding means transversely relative to the axis of the tubular film. The first and second adjusting means are operative to adjust the depth of the gusset to a desired depth in response to the measured deviation of the outer fold lines from their desired positions by the sensing means.

BRIEF DESCRIPTION OF THE DRAWINGS

FIG. 8 is a fragmentary cross-sectional view taken along the line VIII—VIII in FIG. 7 and showing the flattening and take-off apparatus of FIG. 7.

DESCRIPTION OF THE PREFERRED EMBODIMENTS

Figure 1:
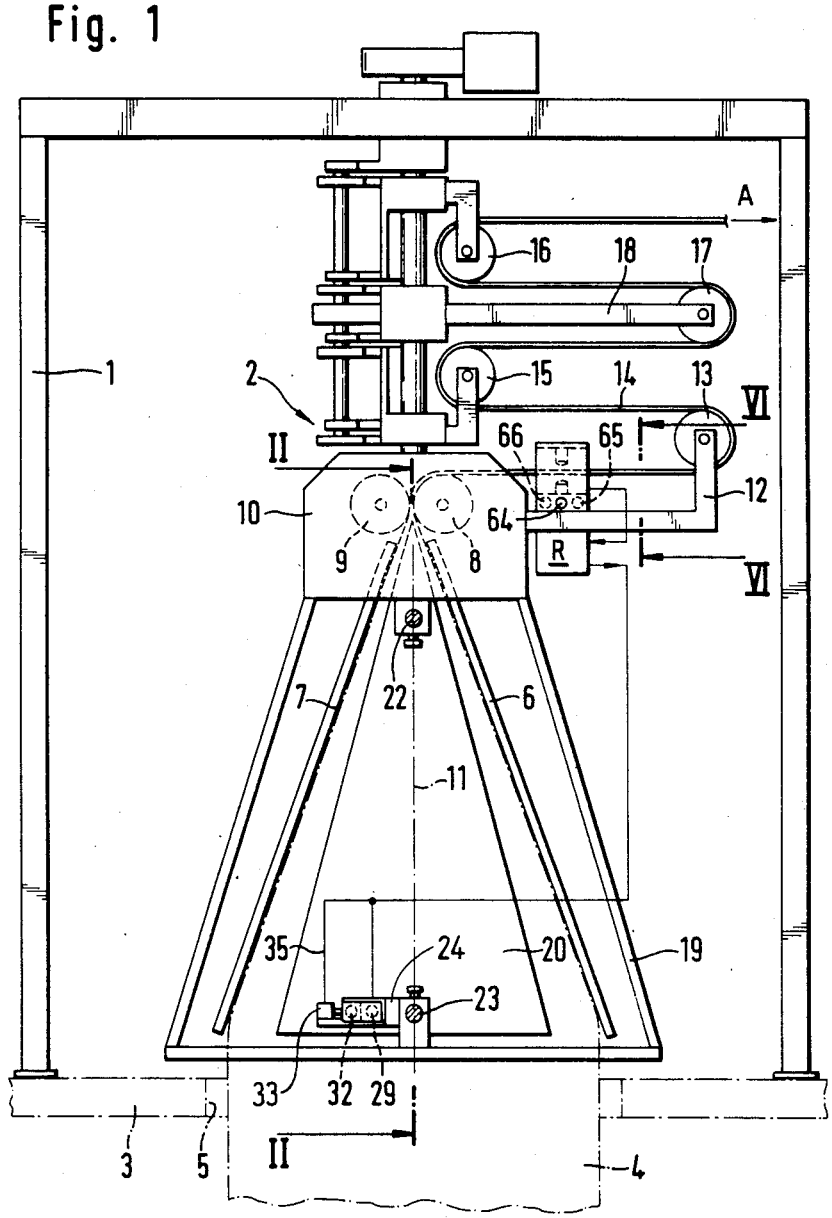
FIG. 1 is a side elevational view diagrammatically showing a first embodiment of a film take-off apparatus in accordance with the present invention, including flattening plates and gusset-forming folding members.

Referring now to the drawings, FIG. 1 shows a frame 1 of a peripherally reciprocating flattening and take-off apparatus for extruded tubular plastic films that have been inflated to form an inflated tube 4. An extruder, not shown, includes an annular die for extruding molten plastic material to form a tubular film and provides for the introduction of air through the die heads to the interior of the film tube. The extruder is disposed below a flattening and take-off apparatus 2 supported within frame 1 and is separated from the latter by a partition 3 that defines a wall at the lower end of frame 1. When the tubular plastic film has been inflated to form a tubular plastic film 4, it moves through an aperture 5 provided in partition 3 and then passes between two rectangular flattening plates 6, 7, which are inclined relative to each other and relative to the direction of movement to define a roof-shaped or wedge shaped structure that terminates in an elongated rectangular opening or gap therebetween, and then between pairs of rollers to be wound up on a core to form a cylindrical roll (not shown), to permit the tubular material to be conveniently transported.

Positioned above the rectangular gap and downstream of flattening plates 6, 7 are a pair of spaced take-off rollers 8, 9 having their axes parallel to each other and to the longer dimension of the gap between plates 6 and 7. As the tube passes between rollers 8 and 9 it is pinched therebetween to become a flattened tube 14. The flattening plates 6, 7 as well as the pinch and take off rollers 8, 9 are mounted in a frame 10, which can be driven to perform a reciprocating rotation through about 360° about the axis 11 of the tubular film so that regions in which the tubular film is of non-uniform wall thickness will be distributed along the axial dimension of the wound roll of film and thereby provide cylindrical rolls.

A pair of laterally spaced protruding arms 12 (only one of which is visible in FIG. 1) is connected to frame 10 and is pivotable about film axis 11 with frame 10. A first deflecting roller 13 for the flattened tube 14 is rotatably carried by arms 12. The flattened tube 14 then passes around two laterally spaced deflecting rollers or rods 15, 16 and around another deflecting roller 17, which is rotatably carried by a pair of laterally spaced pivoted arms 18 that extend between rollers or rods 15, 16. The structure described thus far is known and permits delivery of the flattened tube of film to a stationary winder (not shown), in the direction of the arrow A.

For the purpose of forming a gusset in the tubular film before it is flattened, the frame 10 of the present invention includes a sub-frame 19, in which a pair of triangular folding plates 20, 21 are mounted between the flattening plates 6, 7 and on opposite sides of film axis 11. The folding plates 20, 21 are articulatedly connected to respective upper and lower adjusting rods 22, 23 (see FIG. 2) to permit pivoting of folding plates 20, 21 about transverse axes that are substantially perpendicular to the axes of rods 22, 23, which are linearly guided in sub-frame 19 by respective guide bosses 19a. The axial positions of adjusting rods 22, 23 relative to frame 19 can be manually shifted to vary the area in which the gussets are formed and the depth a of the gussets. The adjusting rods 22, 23 may consist of the piston rods of fluid-operable piston-cylinder units, or they may alternatively consist of simple, manually slidable rods that are frictionally guided in bosses 19a.

Figure 2:
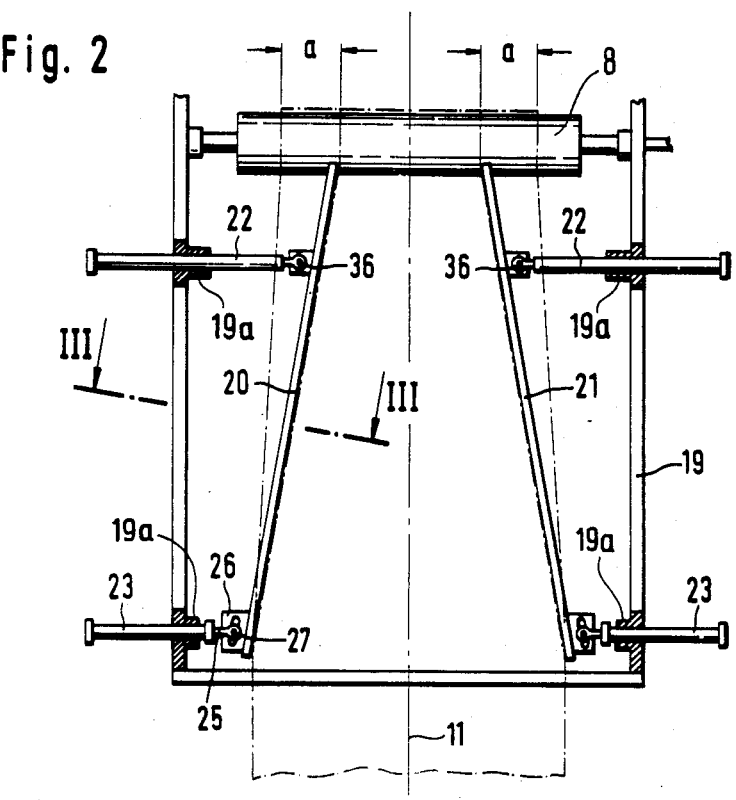
FIG. 2 is a fragmentary cross-sectional view taken along the line II—II of FIG. 1 and showing the flattening and take-off apparatus of FIG. 1.

In the embodiment shown in FIG. 2 the end 25 of each of adjusting rods 23 is pivotally connected to a yoke 26, by means of a transverse pin 25a which is longitudinally slidably guided in a slot 27 in yoke 26 to permit compensation of the length differences which result from different angular positions of the folding plates 20, 21 relative to film axis 11.

Figure 3:
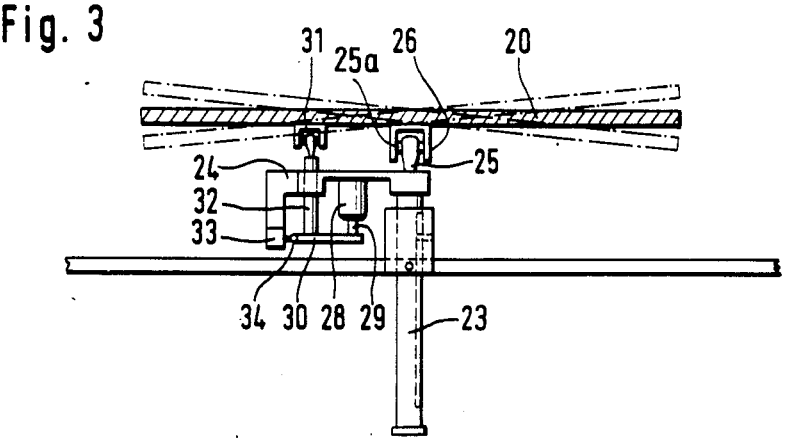
FIG. 3 is a fragmentary cross-sectional view taken along the line III—III in FIG. 2 and showing a gusseting plate.

In the illustrative embodiment shown in FIGS. 1 to 3 the folding plates 20, 21 are also pivotally movable about their longitudinal axes to permit adjustment of the width a of each of the two outer edges of a gusset. With particular reference to FIG. 3, an axially movable rod 25 movably carried by adjusting rod 23 is fixedly connected to a crossbeam 24. The cylinder of a fluid-operable piston-cylinder unit 28, or, alternatively, the frame of a screw-driving electric motor, is secured to the crossbeam 24. The piston rod 29 of that piston-cylinder unit 28, or the screw carried by such electric motor, carries a transverse yoke 30, to which is fixedly secured an adjusting rod 32 that is parallel to the piston rod 29. Adjusting rod 32 is spaced laterally of adjusting rod 23 and is connected by a universal joint 31 to the folding plate 20.

Crossbeam 24 includes a flange 33, which carries a switching element 34, which cooperates with the transverse yoke 30 to indicate to the controller R via the line 35 (see FIG. 1) that the folding plate 20 is in its central position. The piston rod 29 can be extended and retracted to pivot the folding plate 20 about its longitudinal axis, as is indicated by the positions illustrated in dash-dot lines. To permit pivotal movement of the folding plates 20, 21 about their longitudinal center lines, the connections between the plates and the adjusting rods 22, 23 are also universal joints.

Figure 4:
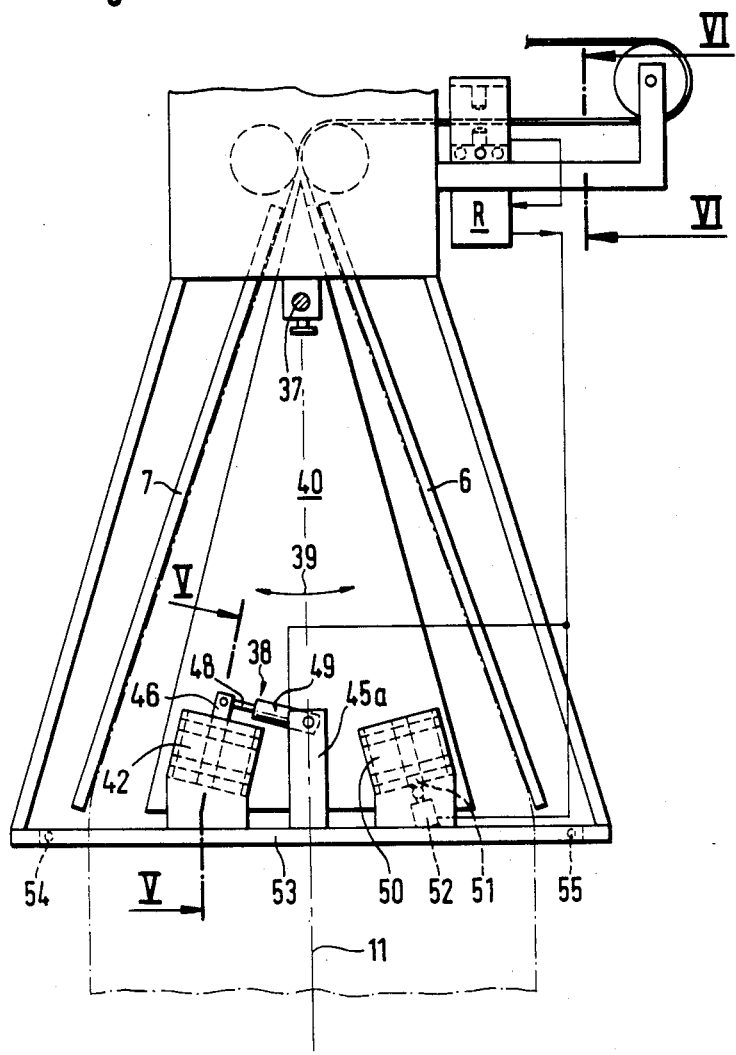
FIG. 4 is a view similar to FIG. 1 and showing a second embodiment of gusseting means in accordance with the present invention.
Figure 5:
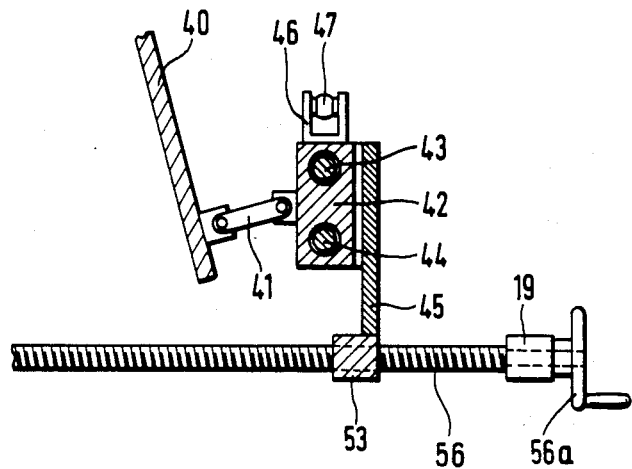
FIG. 5 is a fragmentary cross-sectional view taken along the line V—V in FIG. 4 and showing a folding plate adjusting means.

In the embodiment shown in FIGS. 4 and 5, opposed folding plates 40, only one of which is visible in FIG. 4, extend at right angles to the flattening plates 6, 7 in a horizontal sectional view and are carried on upper adjusting rods 37 by universal joints to permit the plates to be pivotable in all directions relative to rods 37. An adjusting mechanism 38 is provided for imparting a reciprocating pivotal movement to the folding plates in their own planes, about a pivot axis defined by rod 37, and in the directions indicated by the double-headed arrow 39 in FIG. 4.

The adjustment of the folding plates 40 will now be explained only with reference to the forward folding plate 40. As shown in FIG. 5, the lower portion of the triangular folding plate 40 is connected by a link 41 to a carriage 42. By means of guide bores in the carriage 42, the latter is guided on substantially parallel guide rods 43, 44, which are secured to a support bracket 45 by means of crosspieces (not shown). The carriage 42 carries a forked bearing bracket 46, in which the head 47 of the piston rod 48 of the hydraulic cylinder 49, or, alternatively, of a rod extending from an electric positioning motor (not shown), is pivotable about a transverse axis. The other end of cylinder 49 is pivotally mounted to a support bracket 45. The piston rod 48 can be extended and retracted to impart a reciprocating pivotal movement to the triangular folding plate 40 in its plane, in the directions of double arrow 39 in FIG. 4. To provide for symmetry of plate 40 relative to film axis 11, a corresponding second guiding mechanism 50 is provided, which includes a switching cam 51, which cooperates with a switch 52 in order to indicate that the folding plate 40 is in a central position. Switch 52 as well as support bracket 45 are secured to a crossbeam 53. For the depth adjustment of the folding plate 40 relative to film axis 11, the crossbeam 53 is provided with nuts 54, 55 in threaded engagement with screws 56 (see FIG. 5), which carry handwheels 56a and are rotatably mounted in sub frame 19, which rotates with frame 10.

Figure 6:
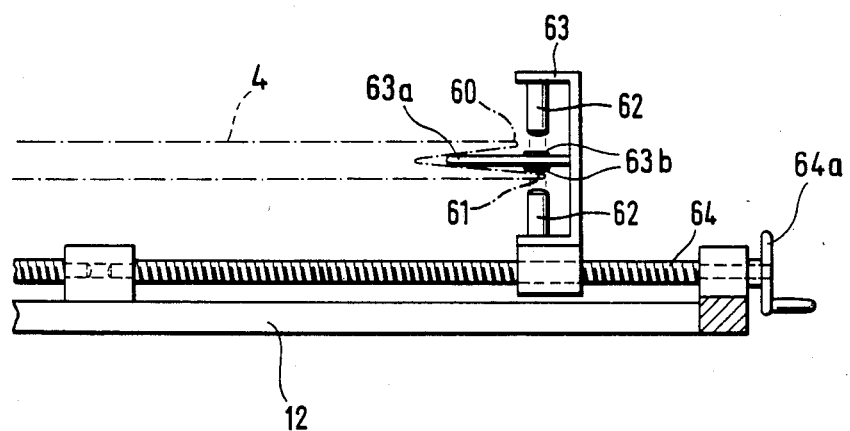
FIG. 6 is a fragmentary cross-sectional view taken along the line VI—VI in FIG. 4 and showing the flattened tubular film.

As is apparent from FIG. 6, which shows one edge of the flattened tube 14, the position of the outer fold lines 60, 61 of the gussets of the flattened tubular film is detected by optoelectronic sensors 62, which are mounted in a carrying frame 63 which is transversely displaceable on spaced, parallel guide rods 65, 66 (see FIG. 1) by a screw 64, which carries a handwheel 64a.

An intermediate carrier plate 63a extends into the gusset and carries reflector 63b, or the like, on each side thereof so that sensors 62 receives a reflected light beam when the gusset does not extend thereover and do not receive a reflected light beam when the gusset does extend thereover. Other sensing means can also be used, as will be appreciated by those skilled in the art.

The optoelectronic sensors 62, which can be light sources and photocells, provide gusset edge position signals to a controller R, which delivers a control signal to the plate adjusting means, which cause the folding plates to perform a pivotal movement in their plane and/or rotate the folding plates about their longitudinal axes through such angles that in a top plan view the outer fold lines 60, 61 of the gussets will either be in superposed relationship, or will be spaced a predetermined distance apart.

Figure 7:
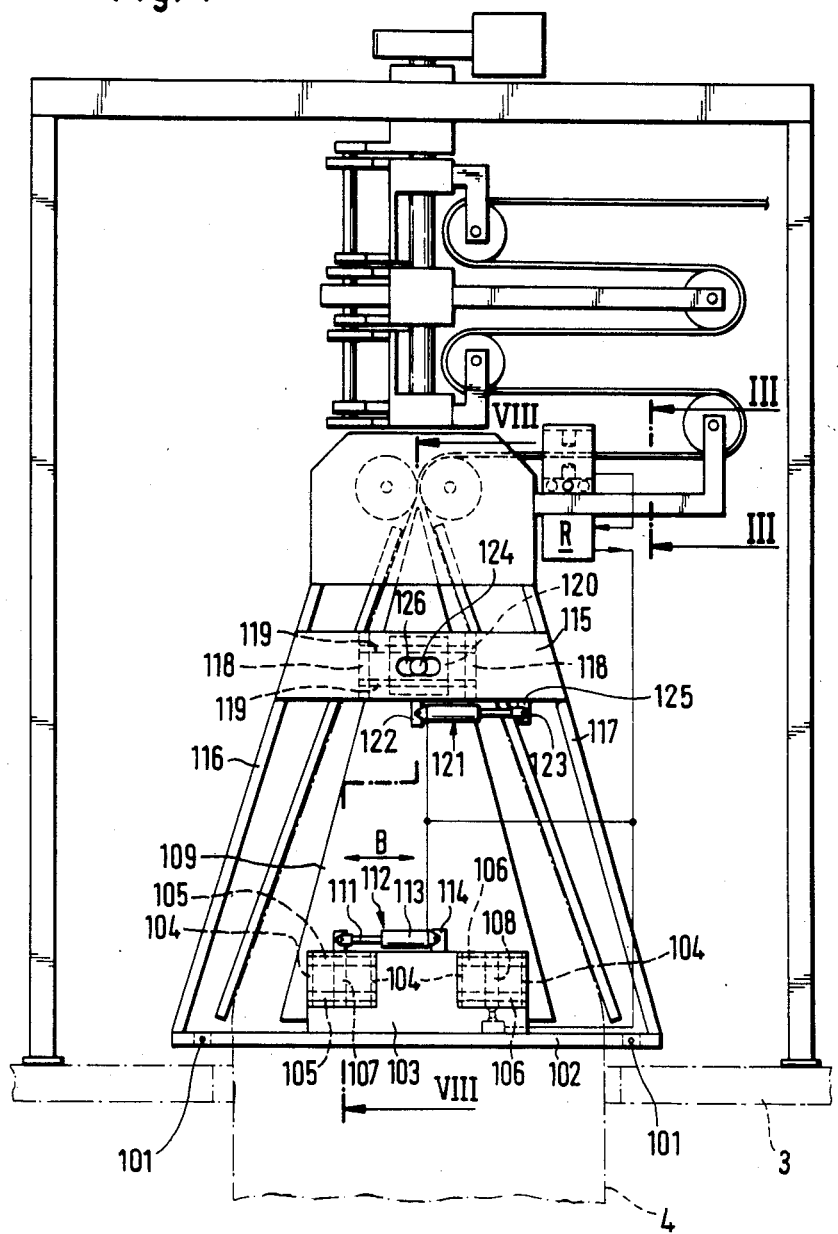
FIG. 7 is a side elevational view diagrammatically showing a second embodiment of a film take-off apparatus in accordance with the present invention including flattening plates and gusset-forming folding members.

The second embodiment of the peripherally reciprocable take-off mechanism will now be described with reference to FIGS. 7 and 8. Just as in the apparatus of the first embodiment shown in FIGS. 1 to 6, the folding plates 109 of the second embodiment have the configuration of isosceles triangles. For this reason only the differences between the embodiment shown in FIGS. 7 and 8 and the first embodiment will now be described.

Beams 102 include threaded nuts (not shown) that are movably carried on threaded screws 101, which are rotatably carried in frame member 116 and are operable to displace beams 102 in a direction perpendicular to their longitudinal axes to move toward and away from tube 4. Side members 103 are mounted on the beams 102 and have holding members 104 fixedly connected thereto. Each of a pair of holding members 104 are secured to a carriage member 107, 108 that is reciprocably carried on respective pairs of parallel guide rods 105, 106. Carriage members 107 and 108 are connected to folding plate 109 by means of articulated levers 110. A piston rod 111 of a piston-cylinder unit 112 is secured to carriage member 107. Cylinder 113 of piston-cylinder unit 112 is mounted on side member 103 by means of a bracket 114.

A plate 115 is provided above the side member 103 and is secured at its opposite longitudinal ends to frame members 116 and 117, respectively. Plate 115 includes two spaced holders 118 that extend inwardly and in which two spaced, parallel guide rods 119 are secured. A carriage 120 is carried on and is reciprocable along guide rods 119 by means of a piston-cylinder unit 121. The cylinder of the unit 121 is connected by a bracket 122 to the carriage 120 and the piston rod is connected to a lever 125, which is welded to plate 115. An adjusting rod 124 is guided in the carriage 120 and is adapted to be locked thereto by a suitable clamping means (not shown). As is apparent from FIGS. 7 and 8, adjusting rod 124 extends also through the plate 115, which is formed with a transverse slot 126. For a basic adjustment the screw 101 is rotated and the adjusting rod 124 is axially displaced to move the folding plate 109 to a predetermined angular position relative to the longitudinal axis 11 of tube 4. The depth of the gusset to be formed is determined by dimension A (see FIG. 8). If the gusset edge sensing system shown in FIG. 6, which is included in the FIGS. 7 and 8 embodiment, detects a deviation of the two outermost edges of a gusset from a desired position, the piston-cylinder units 112 and 121 are actuated at the same time so that the folding plate 109 is laterally displaced in the direction represented by the double headed arrow B shown in FIG. 7.

Although particular embodiments of the present invention have been illustrated and described it will be apparent to those skilled in the art that various changes and modifications can be made without departing from the spirit of the invention. It is intended to cover in the appended claims all such changes and modifications that fall within the scope of the present invention.

What is claimed is:

1. Apparatus for forming opposed gussets in a tubular plastic film, said apparatus comprising:
   (a) flattening means for defining a wedge-shaped gap into which a tubular plastic film passes and is substantially flattened;
   (b) folding means upstream of the gap for deflecting opposed lateral portions of the tube inwardly to form outer fold lines that define gussets, said folding means disposed adjacent opposite wedge-shaped gaps on opposite sides of said flattening means and having longitudinal axes;
   (c) first adjusting means connected to the folding means for pivotally moving said folding means inwardly relative to the axis of the tubular film;
   (d) second adjusting means connected to said folding means for moving said folding means transversely relative to the axis of the tubular film; and
   (e) third adjusting means connected to the folding means for pivotally moving the folding means about their longitudinal axes, said first, second, and third adjusting means operative to adjust the depth of the gusset in response to a measured deviation of the outer fold lines from their desired positions.

2. Apparatus according to claim 1, wherein the folding means include plate like folding members having the configuration of isosceles triangles.

3. Apparatus according to claim 1, wherein said first and second adjusting means each include switch means responsive and for indicating central positions of the respective folding means.

4. Apparatus according to claim 1, including sensing means for detecting the positions of the outer fold lines of the gussets and for determining the deviation thereof from a desired position.

5. Apparatus according to claim 1, wherein said second adjusting means move said folding means transversely relative to the depth direction of the gussets and include carriage means supported by a frame, for slidable movement relative thereto, said folding means articulatedly connected to said carriages means and slidably guided in tracks connected to the frame and that extend transversely to the direction in which the depth of the gussets is adjusted, and said carriage means are provided with displacing means for displacing said carriage means relative to said frame.

6. Apparatus according to claim 5, wherein said folding means are pivoted at their upper portions to respective rods, which are longitudinally slidably guided in the upper carriage means transversely to its direction of movement and are adapted to be fixed in position.

7. Apparatus according to claim 5, wherein fluid-operable piston-cylinder means are provided for displacing the carriages and are pivoted at one end to the carriage and at the other end to the frame.

8. Apparatus according to claim 5, including sensing means for detecting the positions of the outer fold lines of the gussets and for determining the deviation thereof from a desired position.

9. Apparatus according to claim 5, wherein said transversely extending tracks are provided adjacent to the lower and upper portions of the folding means.

10. Apparatus according to claim 9, wherein said transversely extending tracks provided adjacent to the lower portions of the folding means are secured to beams which extend transversely to said tracks, and the beams are mounted by means of nuts on screws that are rotatably mounted in fixed locations in the frame and operable to displace said beams along said screw and transversely relative to the axis of the tubular film.

11. Apparatus according to claim 1, wherein said third adjusting means includes fluid pressure means spaced laterally from the axes of the folding plates for tilting movement of the folding means about their longitudinal axes.

* * * * *